United States Patent [19]

Kawano et al.

[11] 3,916,279

[45] Oct. 28, 1975

[54] FRICTION COMPENSATING APPARATUS FOR LOAD MOVING MACHINES

[75] Inventors: Shigeyoshi Kawano, Hitachiota; Masahiro Ueno, Hitachi; Masami Joraku, Hitachi; Koji Yamauchi, Hitachi, all of Japan

[73] Assignee: Hitachi, Ltd., Japan

[22] Filed: Aug. 16, 1974

[21] Appl. No.: 498,117

[30] Foreign Application Priority Data

| Aug. 20, 1973 | Japan | 48-92494 |
| Aug. 20, 1973 | Japan | 48-92523 |
| Nov. 2, 1973 | Japan | 48-122803 |
| Nov. 2, 1973 | Japan | 48-122806 |

[52] U.S. Cl............ 318/430; 212/39 MS; 254/168; 318/432; 318/436
[51] Int. Cl.².................... H02P 7/06; B66C 13/30
[58] Field of Search .......... 318/430, 432, 433, 434, 318/436; 254/127, 167, 168; 212/126, 131, 132, 39

[56] References Cited
UNITED STATES PATENTS

| 3,841,605 | 10/1974 | Joraku et al. | 254/127 |
| 3,856,266 | 12/1974 | McKendrick | 254/168 |

*Primary Examiner*—Robert K. Schaeffer
*Assistant Examiner*—John J. Feldhaus
*Attorney, Agent, or Firm*—Craig & Antonelli

[57] ABSTRACT

Disclosed is an apparatus for compensating mechanical loss produced in a load moving or transporting machine in which the load can be moved by a small external force as if the load were positioned in a space free from gravity or graviational influence by constantly producing a force from an electric motor which is equal to the weight of the load suspended by the apparatus. A circuit for simulating friction produced upon movement of the load is provided in a torque control circuit for the motor, wherein torque command signal for the motor is divided into a torque command signal corresponding to the weight of load and a torque command signal component corresponding to the friction produced as the load is moved and thereafter is applied to the torque control circuit for the motor.

6 Claims, 13 Drawing Figures

FRICTION COMPENSATING APPARATUS FOR LOAD MOVING MACHINES

The present invention relates to an apparatus which allows a suspended load or weight to be freely moved with a small force.

The principle of the apparatus which is so constructed that the suspended load or weight can be easily and freely moved or displaced with an extremely small force is disclosed in detail in the specification of U.S. Pat. application Ser. No. 317,773 and the corresponding application DOS-2262800.

An important feature of such apparatus can be seen in the fact that the power or force required for supporting the load or weight in a suspended state is produced by the apparatus, while displacement or movement of the load in the suspended state is carried out by man's power or force by directly applying it to the load on the basis of factors required therefor which are determined by operator's judgement or feeling to thereby allow a delicate manipulation of the load. Accordingly, the load can be very easily moved with a small force exerted by the operator as if the load was in a restricted space which is excluded from all gravitational influence. However, an actual apparatus can not be evaded from frictions produced in the mechanism for suspending the load, motor for producing torque and means for transmitting the thus produced torque. Accordingly, in order to further improve the operation of the apparatus, these frictions must be taken into consideration.

The apparatus of the above described type comprises a speed control system including an integrating amplifier and a torque control system. In operation, the operator manipulates a speed command means of the speed control system to lift up the load to a predetermined height. By setting the speed command means to a zero position, the speed at which the load is moved becomes zero with the load stopped in the suspended state. In this state, the motor outputs a power corresponding a sum of the weight of the load and the frictional force to thereby maintain the load in the balanced state, since the load has been raised by overcoming the frictional force. Next, the speed control system is put aside from the operation and the load is to be displaced or moved by the operator with his physical force directly applied to the load. If the load is moved upwardly, an extremely small force will be sufficient therefor. However, when the load is to be moved in the reverse direction, a force of magnitude as greate as more than twice of the frictional force is required. In other words, the force necessary for moving the load can be determined by the relation existing between the moving direction of the load displaced under the control of the speed control system and the direction in which the load is to be displaced by the force of the operator after the load has been stopped.

In the hitherto known apparatus, it was necessary to record the moving direction of the load before it has been stopped and to detect the direction in which the load is to be manually moved. Because the detector is not yet active when the load is to be moved by applying the force, the friction can not be compensated and consequently a very great initial force is required. On the contrary, if the load is to be moved in the reverse direction, a very small amount of force will be sufficient therefor. In this manner, the man's force required for the initiation of the movement of load varies widely in dependence upon the direction in which the load is to be moved. Further, hitherto known friction compensating apparatus are very complicated in their constructions.

An object of the invention is to provide a friction compensating apparatus which serves to stabilize the friction at the initiation of the moving operation.

Another object of the invention is to provide a friction compensating apparatus which is excellent in the stability of its operation.

The apparatus according to the invention comprises a means for simulating the frictional force. The output produced by this friction simulating means is varied in dependence upon the weight of load.

When the load is lifted up by operating a speed control system comprising an integrating amplifier, the output signal from the friction simulating means is applied to a torque control system together with a torque command signal derived from the speed control system. With such arrangement, the torque command value from the speed control system is approximately equal to the weight of the suspended load. When the operation of the speed control system in the suspended state of the load is stopped, a value substantially corresponding to the weight of the suspended load is stored in the integrating amplifier. If the load is displaced by directly applying thereto a man's force, an initial friction force is encounted which remains substantially constant regardless of the directions in which the load is to be moved.

The foregoing objects and other objects as well as characteristic features of the invention will become more apparent from the following description taken in conjunction with drawings in which:

FIG. 1 is a block diagram showing an exemplary embodiment of the invention;

FIG. 2 graphically illustrates relations among speed, weight and frictional force;

FIG. 3 graphically illustrates relations between the weight of load and frictional force converted in terms of torque;

Figure 1:
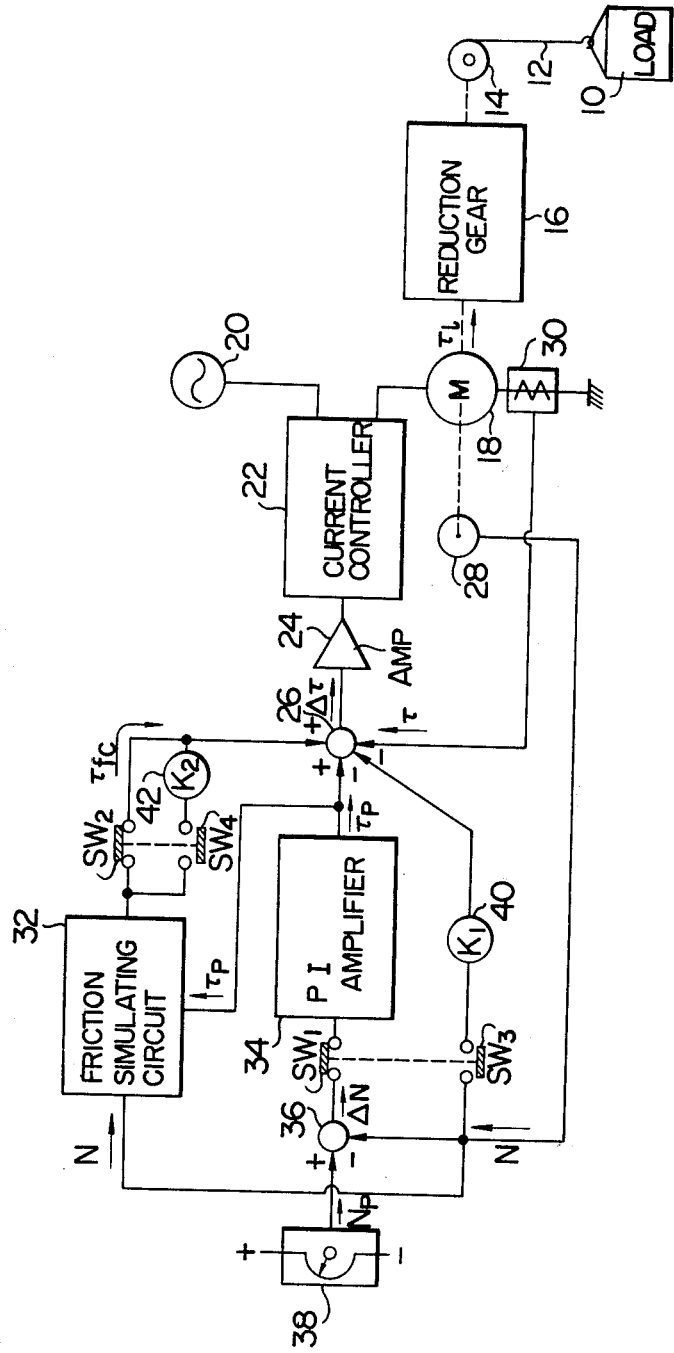

Now, referring to FIG. 1 which shows an exemplary embodiment of the apparatus according to the invention in a block diagram, a load 10 is suspended by a pulley 14 through a wire rope 12. The torque or power required for suspending the load 10 is derived from a d.c. (direct current) motor 18 and applied to the pulley 14 by way of a reduction gear 16. An electric current control apparatus 22 is provided to control the current supplied from an a.c. (alternative current) source 20 to the motor 18 in dependence upon a signal fed from a summing point 26 through an amplifier 24. The value of current actually flowing through the motor 18 is detected by a detector 30 and fed to the summing point 26. Further, the rotational speed of the motor 18 is detected by a speed detector 28, the output from which is applied both to a summing point 36 and a friction simulating apparatus 32. The output of a speed setting apparatus 38 is also applied to the summing point 36. On the other hand, output signal from the summing point 36 is supplied to the summing point 26 through a switch $SW_1$ and a proportional integrating amplifier circuit 34 (hereinafter referred to as a PI amplifier). Moreover, the output from the friction simulating apparatus 32 is also applied to the summing point 26 through a switch $SW_2$ or $SW_4$ and a coefficient multiplier 42. The summing point 26 is additionally supplied with the output from the speed detector 28 through a switch $SW_3$ and a coefficient multiplier 40.

In the following, operations of the apparatus above mentioned will be described.

In the first place, the operation will be considered wherein the load 10 is to be raised to a predetermined height by an operator. At that time, the switches $SW_1$ and $SW_2$ are closed, while the switches $SW_3$ and $SW_4$ are opened. By adjusting the speed setting apparatus 38 which may be composed of a potentiometer, the speed at which the load 10 is to be moved can be established. The output (speed command signal $N_P$) from the speed setting apparatus 38 is applied to the summing point 36 and compared with the output signal N from the speed detector 28. The resulted difference signal $\Delta N$ is input to the PI amplifier 34, the output $\tau_P$ from which in turn is applied to the summing point 26 as a torque command signal for the motor 18. The output from the current detector 30 may be considered to represent the torque $\tau$ actually produced by the motor 18, because the detector 30 is adapted to detect the current actually flowing through the motor 18.

For the simplicity of explanation, it is first assumed that all the frictional forces in the apparatus can be neglected and therefore the operation of the friction simulating apparatus 32 may be put aside from the consideration.

Under such circumstances, the difference $\Delta \tau$ between the output $\tau_P$ from the PI amplifier 34 and the output signal $\tau$ from the current detector 30 is, after having been amplified by the amplifier 34, applied to the current controller 22 to thereby control the latter so that the current supplied to the motor 18 may coincide with the torque command signal $\tau_P$.

It will be noted that the summing point 26, amplifier 24, current controller 22 and current detector 30 cooperate with one another to function as a torque control system for the motor 18, while the PI amplifier 34 serves as speed command means for the torque control system. On the other hand, the speed setting apparatus 38, summing point 36, PI amplifier 34 and speed detector 28 constitute a speed control system or loop.

Next, the operation will be explained in more detail with the aid of mathematical expressions.

If the proportional factor of the PI amplifier is represented by $K_P$ with the integration time constant thereof by $T_1$, the output $\tau_P$ of the PI amplifier can be mathematically expressed as follows;

$$K_P \cdot \Delta N + \frac{1}{T_1} \int_0^\infty \Delta N \cdot dt = \tau_P \quad (1)$$

As above described, by virtue of the operation of the torque control system, the current controller 22 is so regulated that the difference between the output $\tau_P$ of the PI amplifier 34 and the output $\tau$ of the current detector 30 may become equal to zero. Accordingly, $$\tau_P \approx \tau \quad (2)$$

Further,
$$\Delta N = N_P - N \quad (3)$$

From these equations (1), (2) and (3), $$K_P(N_P - N) + \frac{1}{T_1} \int_0^\infty (N_P - N) dt \approx \tau,$$

$$K_P(N_P - N) + \frac{1}{T_1} \int_0^\infty N_P \cdot dt - \int_0^\infty N \cdot dt \approx \tau,$$

and $$K_P(N_P - N) + \frac{1}{T_1}(S_P - S) \approx \tau \quad (4)$$

where $$S_P = \int_0^\infty N_P \cdot dt \quad (5)$$

and $$S = \int_0^\infty N \cdot dt \quad (6)$$

In connection with the equations (5) and (6), it should be noted that $S_P$ represents a command value for the distance of movement or displacement to be performed by the load, while S denotes the actual distance of movement of the load. Further, it is to be appreciated that the output $\tau$ from the current detector 30 represents an electric energy input to the motor in terms of torque and there exists the following relation between the so-called electric input torque $\tau$ and an actual output $\tau l$ from the motor;

$$N = \frac{1}{TA} \int_0^\infty (\tau - \tau l) dt \quad (7)$$

As is apparent from the equation (4), the torque $\tau$ input to the motor is a function determined by the speed error ($N_P - N$) and the displacement error ($S_P - S$). When the load 10 has been moved to a steady position in response to a speed command signal, the difference between $N_P$ and N becomes zero due to the inherent operation of PI amplifier 34.

It is assumed that the load is suspended in a stationary state at a predetermined height attained after the movement of the load. In this state, the output from the speed setting apparatus is equal to zero. Further, the output N from the speed detector 28 is also equal to zero, because the motor 18 is stopped in balance with the load 10. Considering that there occurs no mechanical loss in the motor in the stationary state, then $\tau = \tau l$.

From the equation (4),
$$S_P - S = T_1 \cdot \tau = T_1 \cdot \tau l \quad (8)$$

In this state, even if no speed command signal is produced or $N_P = 0$, the load 10 is held at a predetermined position. This state will be called a servo-balanced state.

In such servo-balanced state, no output can be produced either from the speed setting apparatus 38 or the speed detector 28 so that the PI amplifier 34 receives no input. Even if the switch SW₁ is opened, no change will occur in the output of the PI amplifier 34 due to the holding function inherent to the integrating circuit. Under such conditions, even with an extremely small force exerted to the load by the operator, the load may theoretically be freely lowered or lifted up as if there were no gravitational influence exerted on the load. This state will be called a balanced state free from gravity.

Figure 2:
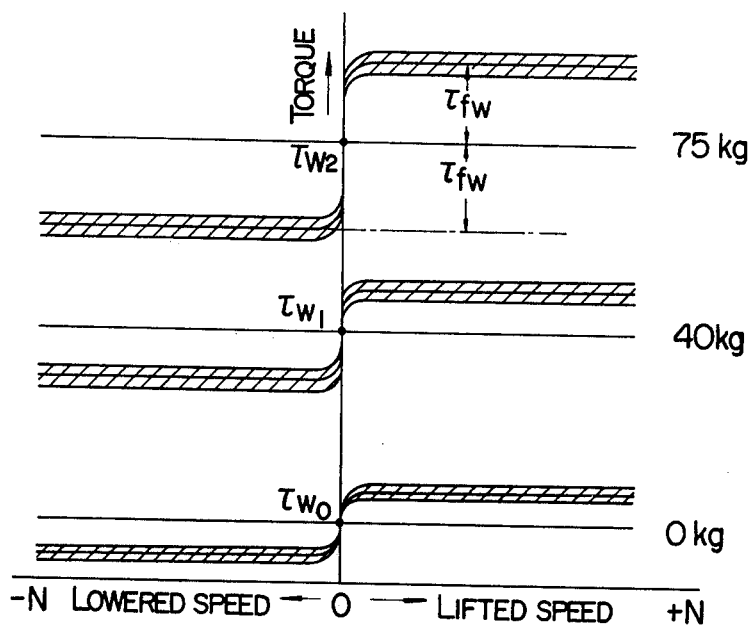

In the foregoing description, friction has been neglected. However, in practice, the frictional loss is not negligible and will amount to considerable values. In the balanced state free from gravity, it has been experimentally found that friction is produced in such a manner as is illustrated in FIG. 2, in which $\tau_{w0}$ represents a force in terms of torque required for moving the load suspending means in the state in which no load is suspended, i.e., against the empty load of the suspending means. $\tau_{w1}$ and $\tau_{w2}$ are corresponding forces required when loads are suspended.

Figure 3:
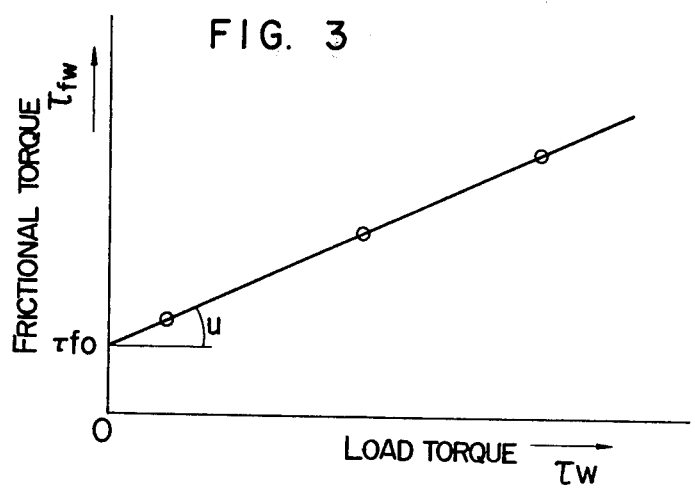

From the results of experiments shown in FIG. 2, it can be seen that frictional torque (frictional force) will become constant, when the speed at which the load is moved has exceeded a predetermined value. The frictional torque will then vary in dependence upon variation in the load torque or weight of load as is illustrated in FIG. 3. If this relation is expressed by equation, $$\tau_{fw} = \text{Sign}(N) \cdot (\tau_{f0} + \mu \cdot \tau_w) \quad (9)$$

where Sign (N) is a quantity determined by the moving direction of the load or rotating direction of the motor produced by the movement of the load under external force.

It will be noted from FIG. 2 that the frictional torque $\tau_{fw}$ is decreased when the rotating speed N approaches to zero. However, this torque $\tau_{fw}$ will never become zero.

Accordingly, when the servo-balanced operation is changed over to the balanced operation free from gravity in the stationary state attained after the load has been lifted up, the motor 18 must output a power of a value greater than the weight of the load 10 by about $\tau_{fw}$. On the contrary, when the chang-over to the balanced state free from gravity is made in the stationary state attained after the load has been lowered, the output from the motor is less than the weight of the load 10 by about $\tau_{fw}$. When the load is in the stationary state, it is essential that the motor should generate the torque which corresponds to the weight of load inclusive of the weight of the suspending means. To this end, the apparatus 32 for simulating the friction $\tau_{fw}$ is provided.

Referring again to FIG. 1, let us consider the relation between the inputs and the output of the summing point 26. In the servo-balanced operation, $$\Delta \tau = \tau_P + \tau_{fc} - \tau \quad (10)$$

where $\tau_{fc}$ represents a frictional torque simulated by the friction simulating apparatus 32. In the steady state, the input torque $\tau$ to the motor is equal to the sum of the weight of load $\tau_w$ (inclusive of the weight of the suspending means) and the frictional force $\tau_{fw}$.

When the load is being lifted up, $$\Delta \tau = \tau_P + \tau_{fc} - (\tau_w + \tau_{fw}) \quad (11)$$

In the steady state, $\Delta \tau$ may be regarded approximately equal to zero. Accordingly, $$\tau_P - \tau_w = \tau_{fw} - \tau_{fc} \quad (12)$$

If $\tau_{fc} = \tau_{fw}$, then $\tau_P = \tau_w$. This means that, when the friction simulating apparatus 32 produces the output $\tau_{fc}$ which is equal to the frictional torque $\tau_{fw}$, the output $\tau_P$ of the PI amplifier will then represent the net weight of the load. In other words, the PI amplifier 34 may always produce a quantity representative of the weight $\tau_w$ by opening the switch SW₁ in this state.

In case the load 10 is to be displaced or moved by the operator, the speed detector 28 will detect the direction of the displacement and produce a corresponding output N which in turn is applied to the friction simulating apparatus 32. In this manner, the friction simulating apparatus 32 will determine a value to be compensated for the friction in dependence upon the weight of the load 10 from the applied output $\tau_P$ of the PI amplifier and additionally determine the polarity of the compensation value from the output N of the speed detector 28.

According to the process as above described, a satisfactory friction compensation can be accomplished in the balanced state free from gravity. However, it should be appreciated that a complete compensation for the friction would be rather dangerous, since the load can be easily moved to a greater degree with a small force. In order to evade such undesirable event, the switches SW₃ and SW₄ are closed and the switch SW₂ is opened simultaneously with the opening of the switch SW₁ to thereby allow the output of the friction simulating apparatus to be decreased by the coefficient multiplier 42. In this case, even if a great force should accidentally be applied to the load by the operator, there will arise no danger that the load would continue to move under inertia, because the friction is not completely compensated by virtue of the action of the coefficient multiplier 42. Further, from the standpoint of safety, it is preferred to restrict the friction compensation to a relatively small value, when the moving speed of the load is remarkably increased. To this end, signals representative of the magnitude and direction of the speed at which the load is moved are derived from the output of the speed detector 28 and applied to the summing point 26 by way of the coefficient multiplier 40 in such sense that the friction compensation may be cancelled to a desired degree.

Figure 4:
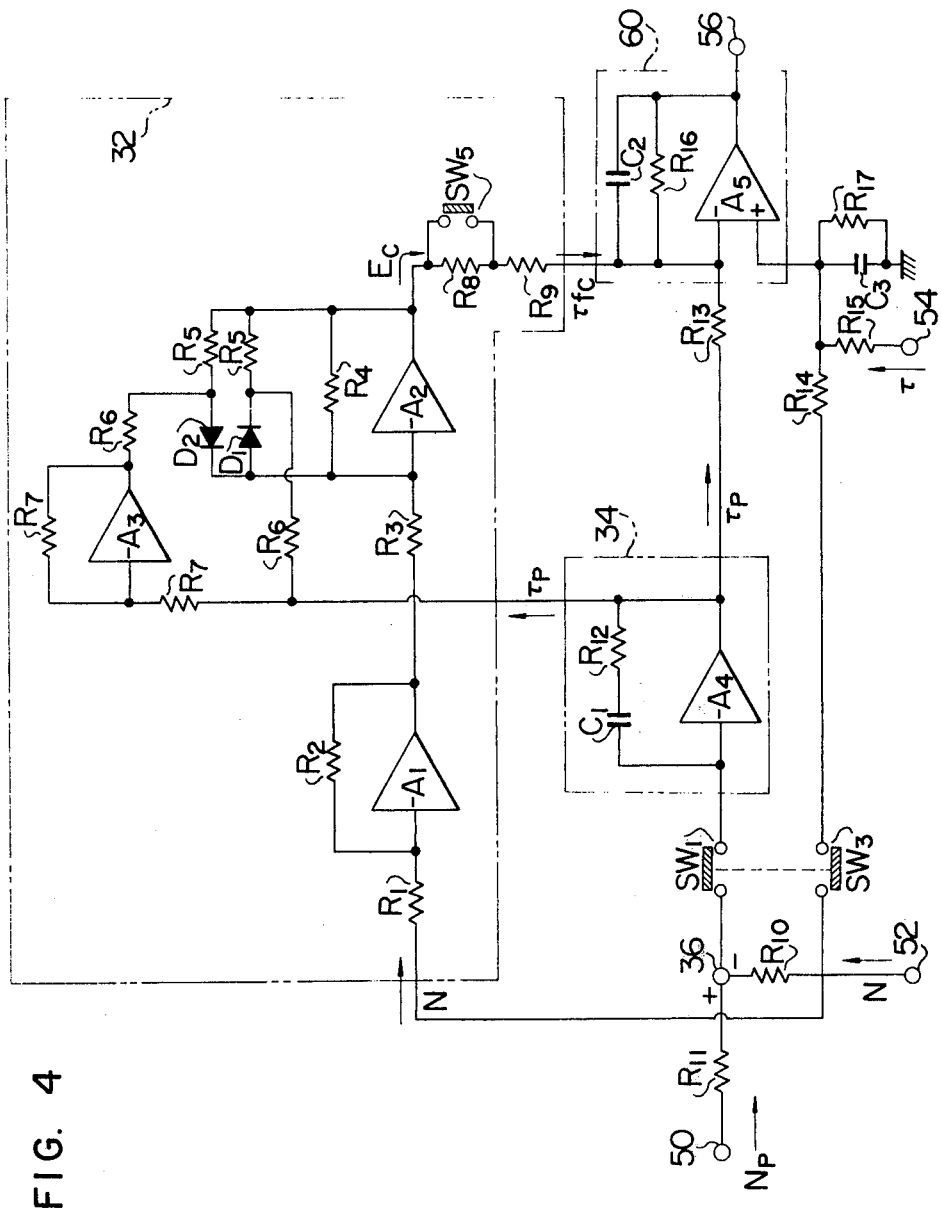
FIG. 4 is a circuit diagram showing in detail an arrangement of a friction simulating circuit employed in the apparatus shown in FIG. 1.

FIG. 4 is a circuit diagram showing a concrete construction of a main portion of the apparatus shown in FIG. 1. The remaining circuit portions are known. For example, reference may be made to U.S. Pat. application Ser. No. 317,773 and the corresponding German application DOS - 2262800.

Referring to FIG. 4, the frictional torque simulating apparatus or circuit 32 comprises operational amplifiers A₁, A₂ and A₃. The PI amplifier 34 is composed of an operational amplifier A₄, while the amplifier 34 as well as the summing point 24 are composed of a circuit 60 having an operational amplifier A₅. Reference letters R₁ - R₁₇ denote resistors and C₁ - C₃ are capacitors.

Assuming that $R_5 \ll R_4$, the output $E_c$ of the amplifier A₂ can be expressed as follows;

$$E_c \approx \text{Sign}(N) \cdot \left\{ \frac{R_5}{R_3} \cdot |N| + \left(1 + \frac{R_5}{R_6}\right) E_f + \frac{R_5}{R_6} \tau_P \right\} \quad (13)$$

where, $E_f$ is a forward drop voltage of diodes D₁ or D₂, $$|N| = \text{Min} \left[ \frac{R_2}{R_1} \cdot N: \text{ saturated output voltage of } A_1 \right] \quad (14)$$

If $E_c$ is equivalently converted to the output voltage of the amplifier $A_4$ and represented by $\tau_{fc}$, $$\tau_{fc} = \frac{R_{13}}{R_9} \cdot E_c \text{ (assuming that } SW_2 \text{ is closed)} \quad (15)$$

Circuit constants of the circuit shown in FIG. 4 can be determined so that the equation (15) may satisfy the equation (9).

An operation of the circuit shown in FIG. 4 will be described by referring at the same time to FIG. 5 which shows characteristic curves.

Input terminals 50, 52 and 54 are, respectively, connected to output terminals of the speed setting apparatus 38, speed detector 28 and current detector 30 shown in FIG. 1. An output terminal 56 is connected to the input terminal of the current controller 22 of FIG. 1.

The circuit comprising an operational amplifier $A_2$, resistors $R_3$ - $R_6$ and diodes $D_1$ and $E_2$ is a generally known limiter circuit. The output $E_c$ of this circuit exhibits characteristics illustrated in FIG. 5. In accordance with the voltage applied through the resistor $R_6$, the magnitudes of voltages at points $\beta_1$ and $\beta_2$ of the characteristic curve will be varied as indicated by dotted lines. It will be noted that there is a greate similarity between this characteristic curve and the friction characteristic curves as hereinbefore described in conjunction with FIG. 2. It is thus possible to make the output of the limitter circuit simulate the frictional torque by applying the output $\tau_p$ of the PI amplifier through the resistor $R_6$. The friction compensation output from the simulating circuit 32 must have either positive or negative value in dependence upon the moving direction of the load and hence the output from the speed detector 28. The limitter circuit therefore has to be able to produce an output with negative or positive polarity. To this end, the output of the PI amplifier is applied to the resistors $R_6$ directly and through the operational amplifier $A_3$ for inverting polarity. The amplification factor of this amplifier $A_3$ is set to 1 by correspondingly selecting the values of two resistors $R_7$, so that the amplifier serves only to invert the polarity of the input signal.

Figure 5:
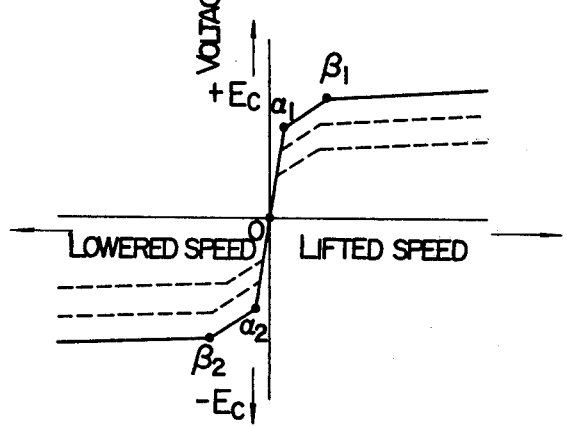
FIG. 5 shows characteristic curves of the friction simulating circuit of FIG. 4.

The operational amplifier $A_1$ and the resistors $R_1$ and $R_2$ are so selected that the slope of segment of the characteristic curve of FIG. 5 between points $\alpha_1$ and $\alpha_2$ becomes very steep. Slopes of segments between the points $\alpha_1$ and $\beta_1$, and $\alpha_2$ and $\beta_2$ are determined by values of the resistors $R_3$ and $R_4$ of the operational amplifier $A_2$.

It should be understood that resistors $R_8$ and $R_{14}$ correspond, respectively, to the coefficient multipliers 42 and 40. Switch $SW_5$ serves to short-circuit the resistor $R_8$ and functions in place of the switches $SW_2$ and $SW_4$.

During the servo-balanced operation, the switches $SW_1$ and $SW_5$ are closed with the switch $SW_3$ opened. When changed-over to the operation free from gravity, the switches $SW_1$ and $SW_5$ are opened, while the switch $SW_3$ is closed. Such change-over is effected manually by the operator.

As will be understood from the foregoing description, according to the present invention, torque $\tau_w$ corresponding to the weight of load can be stored in the PI amplifier 34 during the operation free from gravity. When a load or goods is moved by directly applying thereto physical force, the movement of the load is detected by the speed detector 28 and, in response to the output of the detector 28, a friction compensation output $\tau_{fc}$ is produced from the friction simulating circuit 32 to allow the operator to handle very easily a heavy load with a very small force. Further, the load can be moved upwardly or lowered with a substantially same force, which results in the enhancement of working efficiency and safety.

In case of the illustrated embodiment, during the operation free from gravity the compensating amount for the frictional torque can be decreased by about 60 to 90 percent by way of the coefficient multiplier 40 in order to assure the rapid stop of the load when the applied force is cleared to thereby enhance the accuracy of the stop position. Accordingly, the inventive apparatus can be advantageously employed in the operations which requires a high accuracy such as a mold clamping operation.

By decreasing the torque command value by means of the coefficient multiplier 40 in proportion to the speed during the operation free from gravity, the load is prevented from being moved at a very high speed and thus the safety is also increased.

Figure 6:
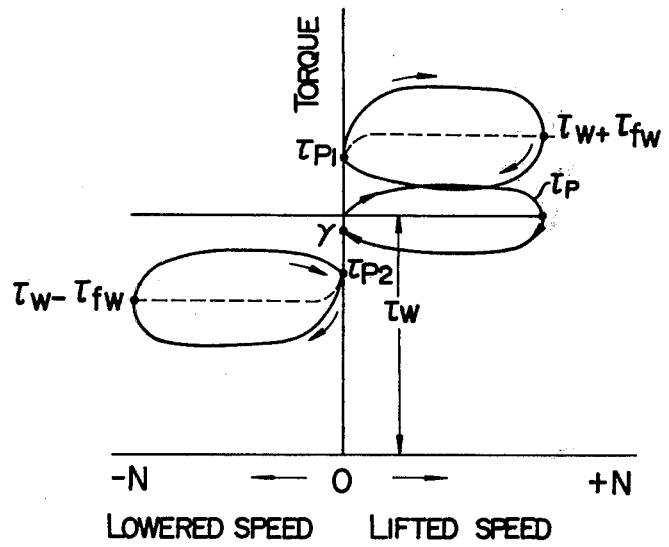
FIG. 6 illustrates relations existing among the moving speed of load, input energy required for a driving motor and output of a proportional integrating amplifier in terms of torque.

In the embodiment of the invention as above described, no consideration has been paid to a force component to accelerate the load. The apparatus described in the foregoing will function satisfactorily when the load is moved very slowly. However, in case of the servooperation in which the load is lowered or lifted up by manually manipulating the speed setting device, the moving speed of the load is usually considerably high. Accordingly, the driving motor has to produce a force to accelerate the load in addition to the power for overcoming the weight of load and frictional force. In other words, the torque output from the motor, which torque is equal to the input torque as hereinbefore described, does not behave in such a manner as represented by dotted curves $\tau_w \pm \tau_{fw}$ in FIG. 6. Assuming that the load is moved upwardly, the torque curve will start from the initial value $\tau_{P1}$ and follow a path located far beyond that of the dotted curve $\tau_w + \tau_{fw}$. The amount in excess of the solid torque curve depends on the acceleration of the load moving upwardly. In the operation with a constant speed, the output torque curve of the motor will of course coincide with the dotted curve $\tau_w + \tau_{fw}$. However, in the operation with deceleration, the motor torque curve will again depart from the curve $\tau_w + \tau_{fw}$. Ultimately, a closed loop depicted in a solid line is produced. The configuration of the loop will be widely varied as a function of acceleration and deceleration imparted to the load to be moved. Influences of such acceleration or deceleration torque can not be removed by the friction simulating circuit 32. As a result, the output of the PI amplifier 34 will be deviated from the torque $\tau_w$ corresponding to the weight of the load (which will be hereinafter termed a net load torque) and vary as shown in FIG. 6. A similar variation will occur in the downward movement for the same reason, although it is not shown in the Figure. When the speed is reset to zero, the output $\tau_P$ of the PI amplifier 34 does not fall in coincidence with the net load torque $\tau_w$ but is deviated therefrom as is indicated by a point $\gamma$, the position of which will varied in dependence on acceleration and deceleration.

In summary of the above examination, the motor output power $\tau$ can be mathematically expressed as follows;

$$\tau = \tau_w + \tau_{fw} + \tau_a \qquad (16)$$

where $\tau_a$ represents an acceleration or deceleration torque. Because of the provision of the friction simulating circuit 32, the output $\tau_P$ of the PI amplifier 34 can be expressed as follows;

$$\tau_P = \tau_w + \tau_a \qquad (17)$$

Figure 7:
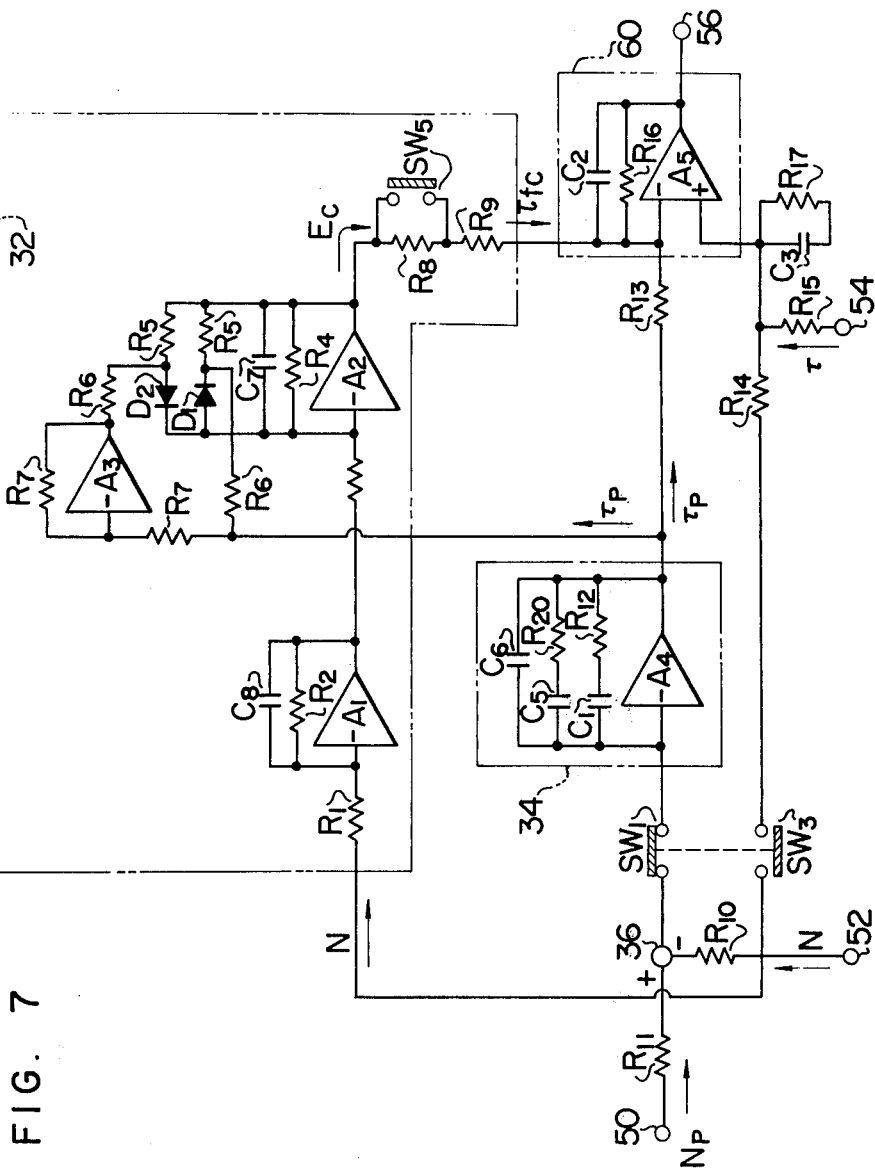
FIG. 7 shows in a circuit diagram another embodiment of the friction simulating circuit.

In case the integrated values of acceleration and deceleration are equal to each other, $\tau_p$ becomes equal to $\tau_w$ when the load is stopped. However, the integrated value of the acceleration is usually different from that of the deceleration. Accordingly, the output $\tau_P$ of the PI amplifier 34 does not coincide with the net load torque $\tau_w$, when the load is stopped. In order to suppress the influence of such effect at a minimum, more than two different constants are provided in the PI amplifier with one constant having a very greate value. In other words, if the time constant produced by a resistor $R_{12}$ and a capacitor $C_1$ of the PI amplifier 34 shown in FIG. 4 is selected at a large value, the output $\tau_P$ of the PI amplifier 34 will approach to the net load torque $\tau_w$. Namely, the point $\gamma$ will lie approximately on the $\tau_w$-curve. However, the selection of large value of the time constant will in turn bring about an appreciable deterioration in the responsibility of the apparatus. For this reason, it is preferred to provide two time constant circuits. FIG. 7 shows an example of such circuit arrangement. The circuit shown in FIG. 7 is different from the one shown in FIG. 4 in that capacitors $C_5 - C_8$ and a resistor $R_{20}$ are provided. Remaining arrangements are similar to those of FIGS. 1 and 4. Referring to FIGS. 4 and 7, the operational amplifiers $A_1$ to $A_3$, resistors $R_1$ to $R_9$, capacitors $C_7$ and $C_8$ and diodes $D_1$ and $D_2$ together constitute the friction simulating circuit 32 as shown in FIG. 1. The capacitor $C_8$ determines a delay time constant of this circuit 32. The diodes $D_1$ and $D_2$ connected in the feed back path of the operational amplifier $A_2$ serve to impart the friction simulating circuit 32 with a saturation characteristic, the value of which is proportional to the output $\tau_P$ of the PI amplifier 34. Comparison of the speed signal is effected by the combination of resistors $R_{10}$ and $R_{11}$. The PI amplifier 34 are composed of an operational amplifier $A_4$, resistors $R_{12}$ and $R_{20}$, and capacitors $C_5$, $C_1$ and $C_6$. Time constants $T_1$ and $T_2$ as hereinafter described are determined by $C_1$, $C_5$, $R_{12}$ and $R_{20}$ as $T_1 = C_1 \cdot R_{12}$ and $T_2 = C_5 \cdot R_{20}$. Capacitor $C_6$ serves to prevent any possible oscillation.

The output $\tau_P$ of the PI amplifier 34 is applied through a resistor $R_{13}$ to a torque control amplifier 60 constituted by an operational amplifier $A_5$, resistor $R_{16}$ and a capacitor $C_2$, together with $\tau_{fc}$ and $\tau$ applied through resistors $R_9$ and $R_{15}$, respectively.

With such arrangement as above mentioned, during the servo-balanced operation, the torque $\tau_{fw}$ corresponding to a mechanical loss can be fully compensated by the friction simulating circuit 32 and the steady output $\tau_P$ of the PI amplifier 34 can be made to coincide with the net load torque $\tau_w$. As will be apparent from the description in conjunction with FIG. 1, the simulating circuit will compensate the torque $\tau_{fw}$ corresponding to mechanical loss in the balanced operation free from gravity, which thus allow the operator to handle the load article with a small external force.

Next, the operation will be described wherein the output $\tau_P$ of the PI amplifier at the time of the load being stopped can be caused to coincide with the net load torque $\tau_w$ even in the presence of acceleration and deceleration torque $\tau_a$ in the servo-balanced operation. A pair of CR-series circuits for the proportional integration are disposed in a form of the feed back paths of the operational amplifier $A_4$ constituting the PI amplifier 34. One of the series circuits is composed of a capacitor $C_1$ and a resistor $R_{12}$, while the other series circuit is composed of $C_5$ and $R_{20}$.

Figure 8:
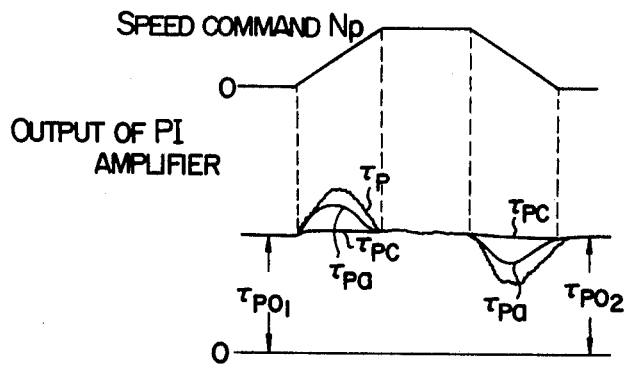
FIG. 8 shows characteristic curves of the proportional integrating amplifier.

The time constants $T_1 = C_1 \cdot R_{12}$ and $T_2 = C_5 \cdot R_{20}$ are selected so as to differ from each other, for example $T_1 < T_2$, with the values of capacitor $C_1$ and the resistor $R_3$ for $T_1$ being selected so that a stable control operation, i.e., a suitable responsibility may be assured. On the other hand, the time constant $C_5 \cdot R_{20}$ of the other circuit are selected at an allowable maximum value. FIG. 8 shows behavior of the output signal $\tau_P$ of the PI amplifier 34, voltage $\tau_{Pa}$ of the capacitor $C_1$ and voltage $\tau_{Pc}$ of the other capacitor $C_5$ in response to the applied speed command signal Np in the servo-balanced operation. When the speed command signal Np is input, the output $\tau_P$ of the PI amplifier 34 contains a torque command signal component corresponding to the acceleration torque $\tau_a$. The capacitor voltage $\tau_{Pa}$ of the feed back circuit of a small time constant $T_1$ will be varied. However, the voltage $\tau_{Pc}$ of the capacitor $C_5$ exhibits little variation and will remain substantially unchanged at the value $\tau_{P01}$ which prevailed before the initiation of the operation, because the amount of charge during the acceleration period is very small due to the large value of the time constant. When the deceleration command is input, same situation will be produced. In brief, the voltage $\tau_{Pc}$ of the capacitor $C_5$ will hold a value $\tau_{P02}$ which is substantially equal to the value $\tau_{P01}$ before the operation. Further, the voltage $\tau_{Pa}$ of the capacitor $C_1$ will become stabilized at the value $\tau_{P02}$ due to the action of the capacitor $C_5$. In case the voltage held by the PI amplifier 34 before the operation is equal to the net load torque $\tau_w$, the latter is retained even after the operation.

As will be apparent from the foregoing description, according to the embodiment shown in FIG. 7, not only the mechanical loss which incurs the increase in the external manipulating force in the balanced operation free from gravity can be fully compensated, but also the torque error which possibly occurs upon stopping the servo-balanced operation can be removed, which thus results in a stability and an improved control of the operation free from gravity.

Figure 9:
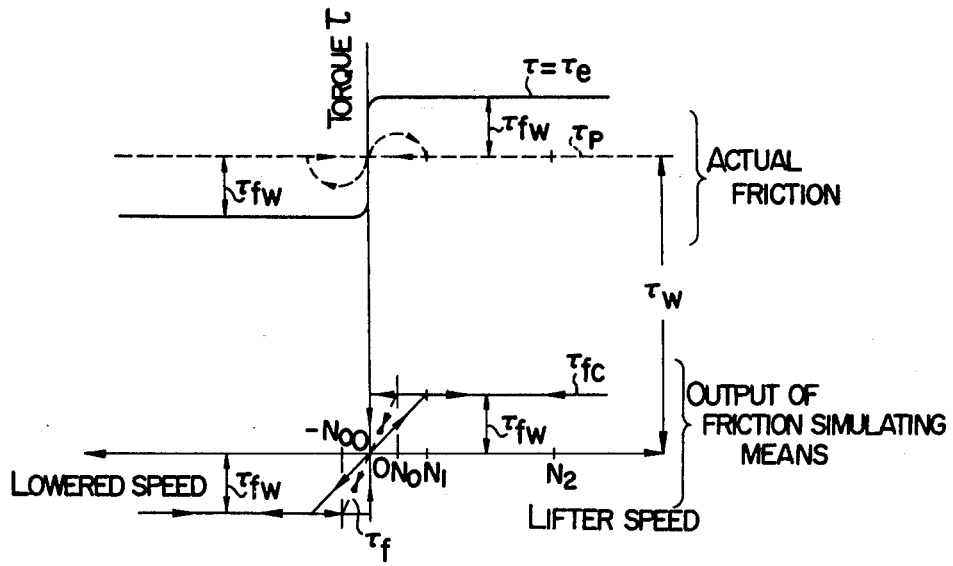
FIG. 9 illustrates an actual friction characteristic and the characteristic of the friction simulating circuit.

In the embodiment shown in FIG. 7, the capacitor $C_8$ serves to provide a delay for the operation of the friction simulating circuit 32. Referring to FIG. 9, the output $\tau_{fc}$ of the friction simulating circuit 34 has a saturation characteristic such as shown in broken line in FIG. 9 as hereinbefore stated. The output $\tau_{fc}'$ of the friction simulating circuit 34 subjected to a delay through any delay element is smaller than non-delayed output $\tau_{fc}$ during the internal in which the speed N is increased from the initial value zero to $N_1$ and consequently the compensation amount $\tau_{fc}'$ will remain insufficient for compensating the mechanical loss $\tau_{fw}$, as a result of which the output $\tau_P$ of the PI amplifier 34 is deviated from the net load torque $\tau_w$ as is indicated by the broken line. When the speed N becomes higher than $N_1$, the mechanical loss $\tau_{fw}$ is sufficiently compensated and consequently the output $\tau_P$ of the PI amplifier 34 will become equal to the net load torque $\tau_w$. At the time of deceleration, the above relation is maintained by virtue of the delay element until the speed N has become equal to zero. As a result, the output $\tau_P$ of the PI amplifier 34 is held at the value of the net load torque $\tau_w$ until the operation has been stopped, when the switch $SW_1$ is opened to change-over the operation to the balanced operation free from gravity, the above described conditions are both fulfilled to assure a well balanced operation free from gravity.

Figure 10:
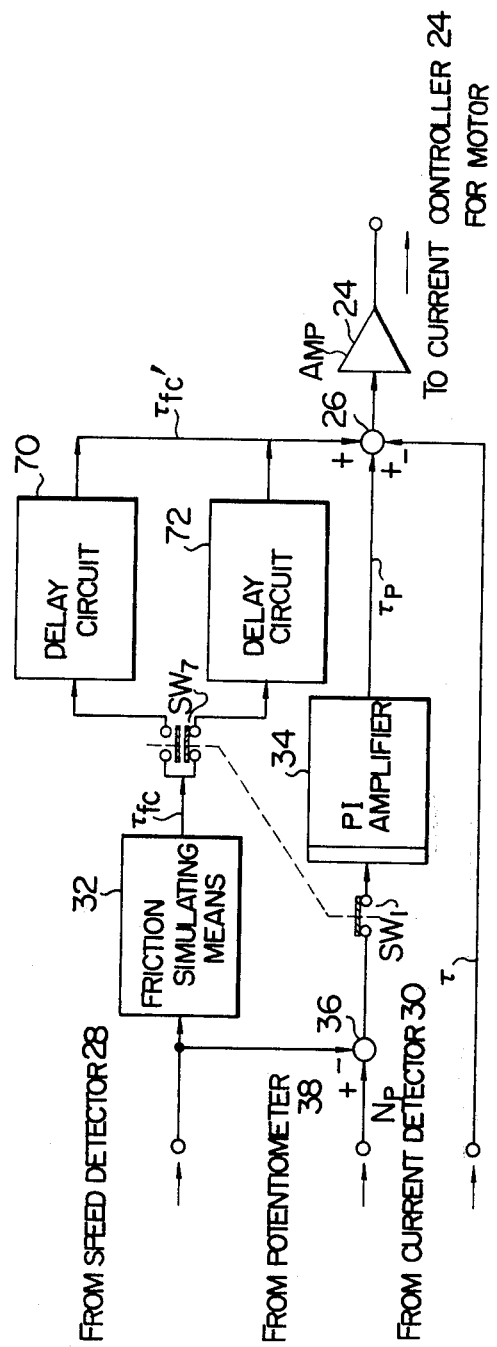
FIG. 10 is a circuit diagram showing another embodiment of the invention.

It will be appreciated that the time constant of the delay element has to be greater than a certain value. However, a very large value of this time constant will incur some difficulty in the manipulation of the load by the external force in the operation free from gravity. In more detail, the load will not move initially in response to the force exerted by the operator until a certain time interval has been elapsed. FIG. 10 shows in a block diagram a main portion of another embodiment of the apparatus according to the present invention in which the just above mentioned disadvantage can be evaded, while portions of the circuit common to those of FIGS. 1 and 4 are omitted. It will be noted that two delay elements or circuits 70 and 72 are used in the circuit shown in FIG. 10. A switch $SW_7$ which is interlocked with the switch $SW_1$ is provided at the output side of the friction simulating circuit 32 in order to couple the output $\tau_{fc}$ of the circuit 32 to the delay element or circuit 72 in the servo-balanced operation and to the delay element 70, on the other hand, in the operation free from gravity, respectively. The time constant of the delay circuit 70 is selected at a value smaller than that of the delay circuit 72. With this circuit arrangement, the delay in the response of the apparatus to external manipulating force can be minimized, while the value of $\tau_P$ attained at the time of the speed zero in the servo-balanced operation is maintained constant. Of course, the circuit arrangement shown in FIG. 7 also can be employed satisfactorily, if the time constant of the delay element 72 presents substantially no obstacle in practice.

Figure 11:
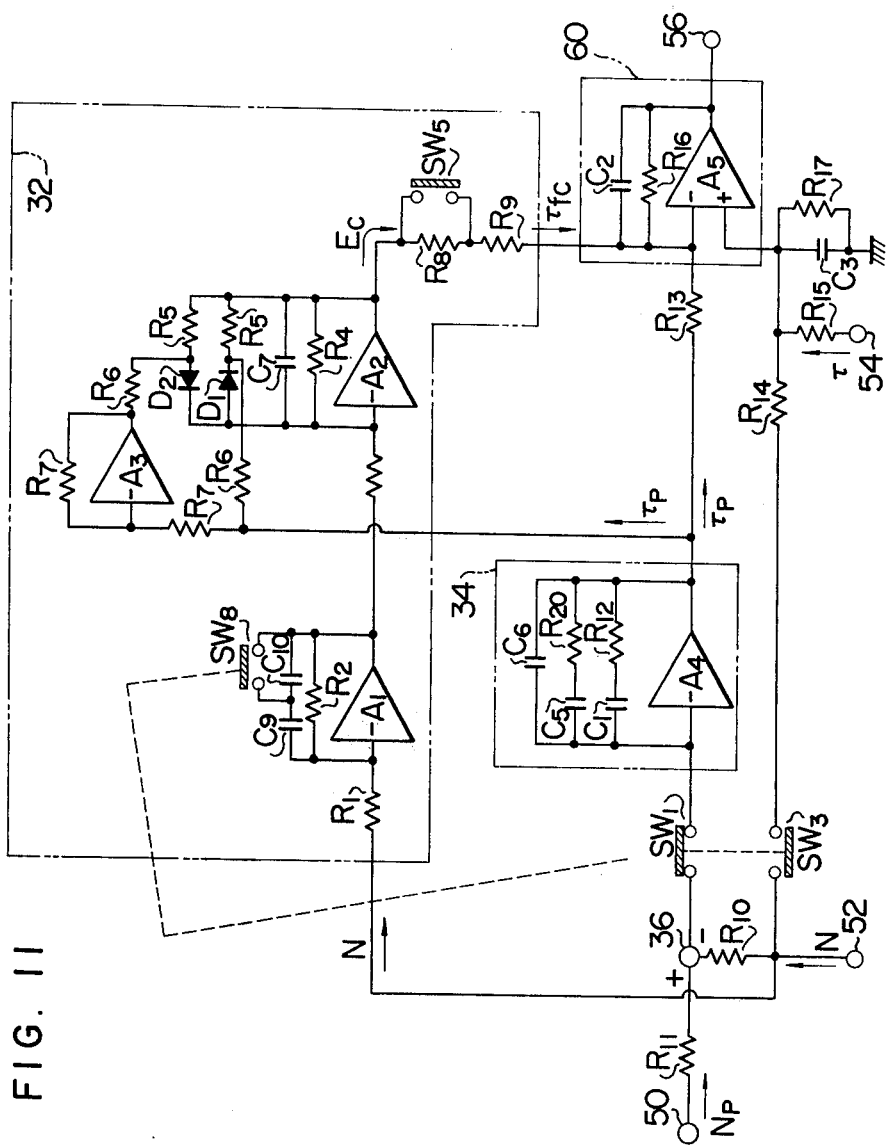
FIG. 11 shows in more detail an arrangement of the circuit shown in FIG. 10.

FIG. 11 is a view similar to FIG. 10 showing still another embodiment of the invention. Since the elements or units indicated by same reference symbols as in FIGS. 1, 4 and 7 serve to the like functions as those shown in these figures, further description thereof will be unnecessary. Referring to FIG. 11, both switches $SW_1$ and $SW_2$ are closed in the servo-balanced operation. The time constant of the amplifier $A_1$ is determined by a capacitor $C_9$ and a resistor $R_2$. When changed-over to the operation free from gravity, the switch $SW_1$ is opened together with the switch $SW_8$. Then, the capacitor $C_9$ is connected in series to the capacitor $C_{10}$ so that the resulting capacitance is decreased. As a consequence, the time constant of the amplifier $A_1$ becomes correspondingly smaller with the responsibility being increased.

Figure 12:
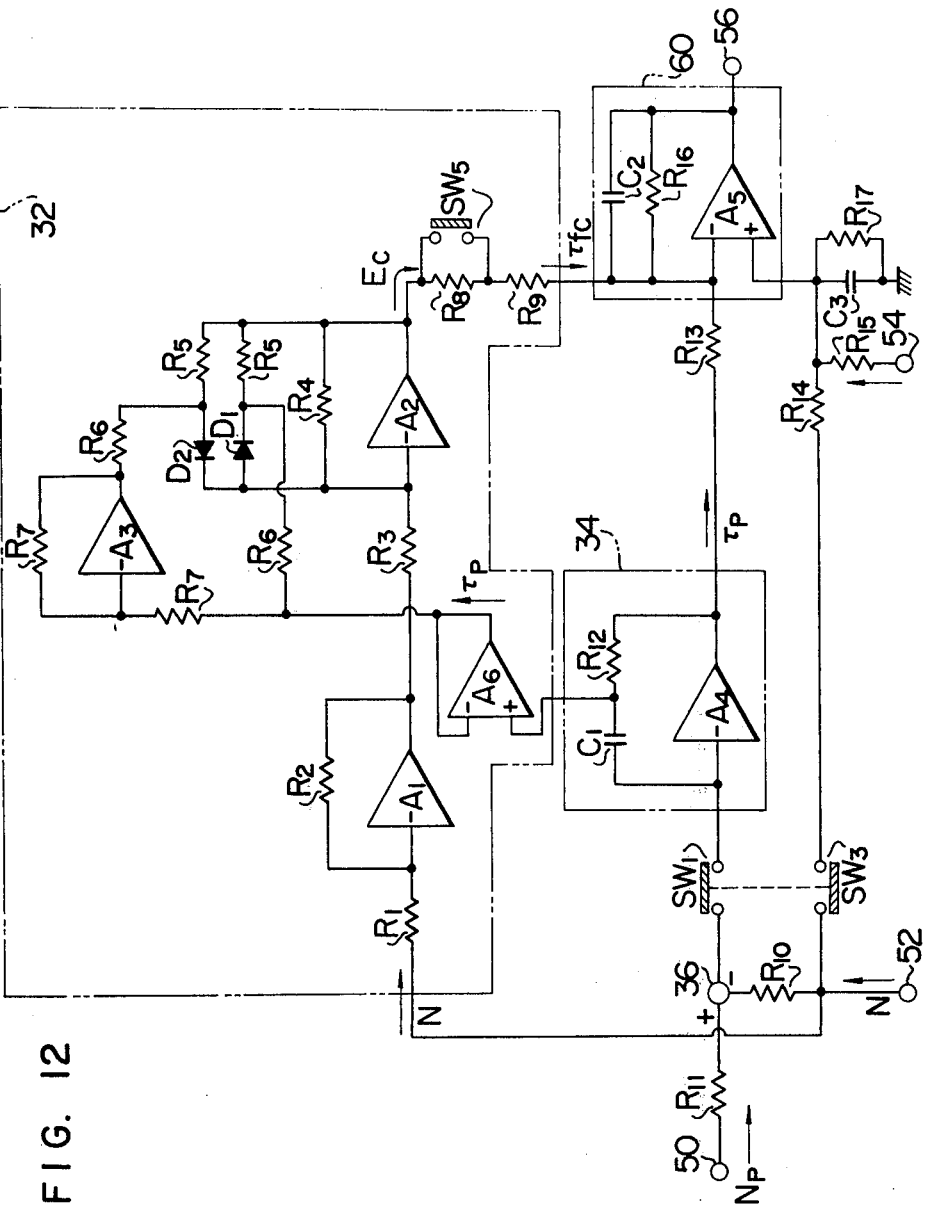
FIG. 12 shows another embodiment of the friction simulating circuit.
Figure 13:
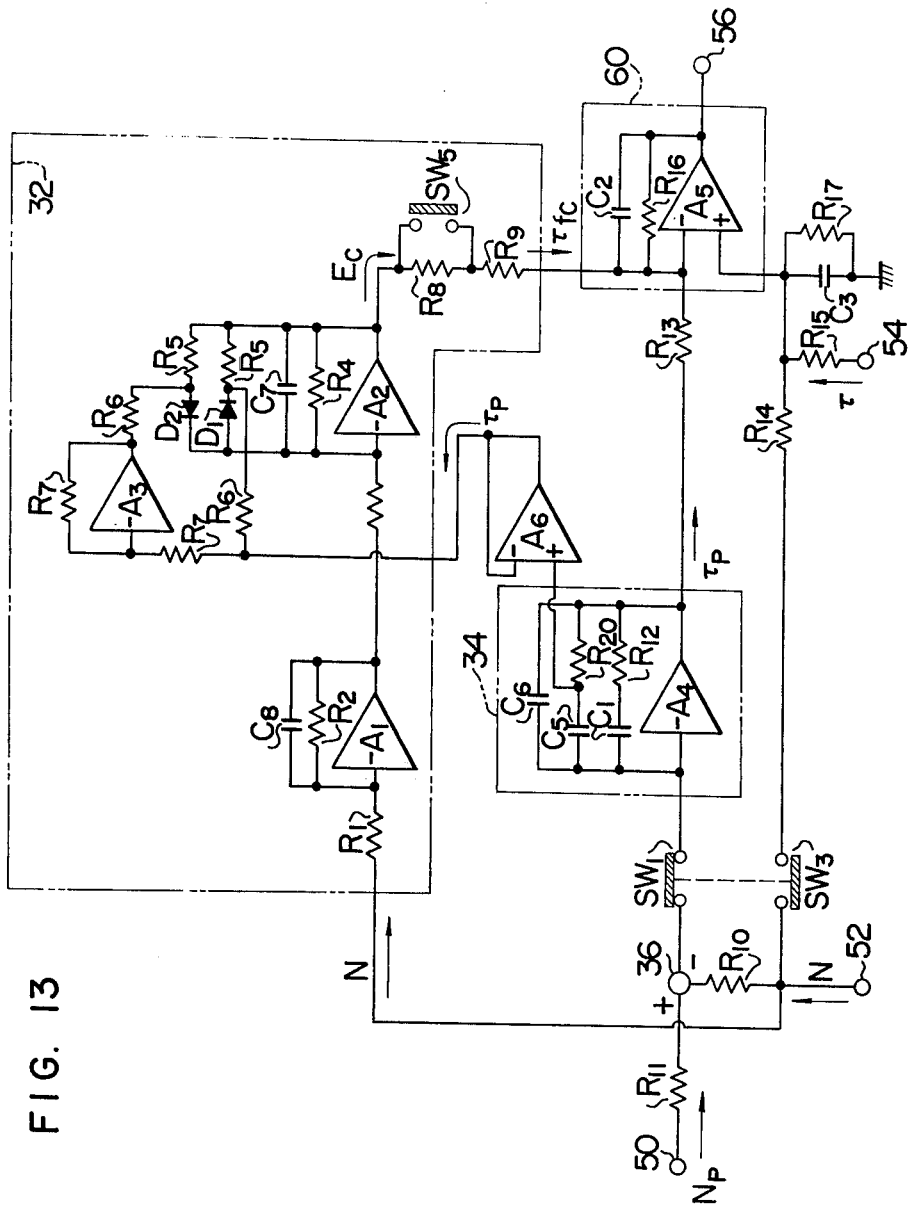
FIG. 13 shows still another embodiment of the friction simulating circuit.

In the circuits described above, the output of the PI amplifier 34 is applied to the friction simulating circuit 32. However, the charged voltage of the capacitor $C_1$ or $C_5$ inserted in the feed back path of the PI amplifier 34 may, alternatively, be applied to the friction simulating circuit 32, because the charged voltage represents the net load torque (weight of the load). FIGS. 12 and 13 show examples of such circuit arrangement. It will be noted that an input impedance is increased by using an operational amplifier $A_6$ so as to protect the capacitor $C_1$ or $C_5$ from any possible adverse influences. This circuit is generally known as a voltage follower circuit.

What we claim is:

1. In an apparatus for moving a load comprising means for suspending said load, a motor to provide a force for said suspending means to suspend said load, a speed command means to command a speed at which said load is to be moved, a speed detector means to detect the rotating speed of said motor, means for controlling current supplied to said motor, means for detecting an output of said motor, a first summing means for determining the difference between the output of said speed command means and the output of said speed detector means for said motor, a first switching means, an integration amplifier adapted to receive the output from said first summing means by way of said first switching means, and means for comparing the output of said integration amplifier with the output from said motor output detecting means to thereby produce an output, in dependence upon which said motor current control means controls current supplied to said motor; the improvement that which further comprises means for receiving a signal representative of the weight of said load and a signal representative of the movement of said load to produce an output signal simulating any friction of said apparatus, which output signal is input to said comparator means.

2. An apparatus for moving a load as set forth in claim 1, in which means is provided to delay the response of said friction simulating means.

3. An apparatus for moving a load as set forth in claim 2, in which said friction simulating means comprises at least two different types of means for delaying the response thereof, one of which means has a delay time constant greater than that of the other delay means, and in which second switching means is provided which is operative in synchronizm with said first switching means in such a manner that the delay of said friction simulating means is increased when said first switching means is closed, while said delay is decreased when said first switching means is opened.

4. An apparatus for moving a load as set forth in claim 1, in which said integration amplifier comprises an operational amplifier, a first time constant circuit composed of a first capacitor and a first resistor and having a first time constant, and a second time constant circuit composed of a second capacitor and a second resistor and having a second time constant.

5. An apparatus for moving a load as set forth in claim 1, in which said friction simulating means comprises a limiter circuit, the limitting voltage of which is determined by the signal from said integration amplifier.

6. An apparatus for moving a load as set forth in claim 5, in which means is further provided to invert the polarity of the signal from said integration amplifier, said signal being applied directly to said limitter circuit and on the other hand applied to said limitter circuit through said polarity inverter means.

* * * * *